(12) United States Patent
May et al.

(10) Patent No.: US 11,946,740 B2
(45) Date of Patent: Apr. 2, 2024

(54) COATING THICKNESS MEASUREMENT INSTRUMENT

(71) Applicant: Elcometer Limited, Manchester (GB)

(72) Inventors: Philip Anthony May, Lancashire (GB); Simon Trevena Coulton, Yorkshire (GB); Alan James Dodd, Bolton (GB); Maria Isabel Jimenez-Lopez, Derby (GB)

(73) Assignee: Elcometer Limited, Manchester (GB)

( * ) Notice: Subject to any disclaimer, the term of this patent is extended or adjusted under 35 U.S.C. 154(b) by 0 days.

(21) Appl. No.: 17/528,792

(22) Filed: Nov. 17, 2021

(65) Prior Publication Data
US 2022/0163315 A1 May 26, 2022

(30) Foreign Application Priority Data
Nov. 20, 2020 (GB) ..................................... 2018269

(51) Int. Cl.
*G01B 7/06* (2006.01)
(52) U.S. Cl.
CPC .................... *G01B 7/105* (2013.01)
(58) Field of Classification Search
CPC . G01B 7/105; G01B 1/00; G01B 3/00; G01B 5/00; G01B 7/00; G01B 9/00;
(Continued)

(56) References Cited

U.S. PATENT DOCUMENTS 3,780,859 A 12/1973 Scherf et al.
5,847,562 A 12/1998 Fulton et al.
(Continued)

FOREIGN PATENT DOCUMENTS

GB            2367135 A     3/2002
WO   WO 2006/046859 A1     5/2006
WO   WO 2006/135977 A1    12/2006

OTHER PUBLICATIONS

Elcometer 456 "Elcometer 456³ Coating Thickness Gauge Top Models Operating Instructions" (2004).
(Continued)

*Primary Examiner* — Feba Pothen
*Assistant Examiner* — Brent J Andrews
(74) *Attorney, Agent, or Firm* — Gerald T. Gray; Leydig, Voit & Mayer, LTD.

(57) ABSTRACT

A coating thickness measuring instrument comprising: a magnetic induction probe comprising at least one drive coil and at least one pick-up coil; a driver for driving an alternating current in the or each drive coil; and a detector for detecting the output of the or each pick-up coil; and a processor configured to: apply a transfer function to the detector output to produce an output which corresponds to a measured coating thickness; and, scale both the drive current and detector output simultaneously in response to the output. The scaling may be changed in a step-wise manner. The scaling applied to the drive current may be inversely proportional to the scaling applied to the detector output. The scaling may be defined by a first and second scaling factor, stored as a pair. The instrument may store two or more pairs of scaling factors and select a pair in response to the measured coating thickness.

17 Claims, 2 Drawing Sheets

(58) Field of Classification Search
CPC ........ G01B 11/00; G01B 13/00; G01B 15/00; G01B 17/00; G01B 21/00; G01B 2210/00; G01B 2290/00
See application file for complete search history.

(56) References Cited

U.S. PATENT DOCUMENTS

| | | | | |
|---|---|---|---|---|
| 2002/0008511 A1* | 1/2002 | Davies | .................. | G01B 7/105 |
| | | | | 324/230 |
| 2003/0062891 A1* | 4/2003 | Slates | .................. | G01D 5/2053 |
| | | | | 324/207.26 |
| 2009/0101469 A1* | 4/2009 | Baudat | .................... | G01B 7/10 |
| | | | | 194/317 |
| 2015/0305823 A1* | 10/2015 | Claus | .................... | A61B 5/061 |
| | | | | 600/424 |

OTHER PUBLICATIONS

Elcometer 456 "Coatings Inspection Instrumentation" (2002).
Elcometer 456 "Operating Instructions for Elcometer 456. Top Models—Memory with Auto Batching. Ferrous, Non-Ferrous and Dual Ferrous/Non-Ferrous Models" *Doc No. TMA0237 Issue 01* (2001).

* cited by examiner

COATING THICKNESS MEASUREMENT INSTRUMENT

TECHNICAL FIELD OF THE INVENTION

The present invention relates to coating thickness measurement instruments, in particular to inductive coating thickness instruments.

BACKGROUND TO THE INVENTION

An existing coating thickness measurement instrument is disclosed in GB2367135A. The instrument is controlled according to two modes of operation. In the first mode, the instrument operates over a short range of coating thicknesses but with high resolution. In the second mode, the instrument can measure a greater range of coating thicknesses than the first mode, but with a reduction in resolution.

The instrument disclosed in GB2367135A switches between each mode by activating a feedback loop that automatically varies the electronic gain of the instrument in the second mode. However, use of such a feedback loop can lead to slow response times for the instrument and time-invariant measurements due to instabilities in the feedback loop.

It is an object of embodiments of the present invention to at least partially overcome or alleviate the above problems.

SUMMARY OF THE INVENTION

According to a first aspect of the present invention there is provided a coating thickness measuring instrument comprising: a magnetic induction probe comprising at least one drive coil and at least one pick-up coil; a driver for driving an alternating current in the or each drive coil; a detector for detecting the output of the or each pick-up coil; and, a processor configured to: apply a transfer function to the detector output to produce an instrument output corresponding to a measured coating thickness; and scale both the drive current and detector output simultaneously in response to the output.

According to a second aspect of the present invention there is provided a method of measuring a coating thickness using a coating thickness probe comprising at least one drive coil and at least one pick-up coil, the method comprising the steps of: driving an alternating current in the or each drive coil; detecting a signal output by the or each pick-up coil; applying a transfer function to the detected signals to determine an instrument output corresponding to the measured coating thickness; and scaling both the drive current and the detected output of the or each pick-up coil simultaneously in response to the instrument output.

Scaling of the drive current and detected output enables performance of the instrument to be optimised and minimise error. The application of a transfer function further facilitates enhanced performance over the full measurement range of the probe and can reduce susceptibility to tip wear negatively affecting probe performance.

The output of the one or more pick up coils may be referred to as either the detected output or the detector output interchangeably.

The processor may be configured to determine a normalised output. The step of applying the transfer function may include determining a normalised output. The normalised output may be a linear scaling of the instrument output. The normalised output may be used in place of the instrument output. The normalised output may correspond to a measured coating thickness. A normalised output of zero may correspond to a measured coating thickness of zero, or no detected coating. A normalised output of one may correspond to a maximum measured coating thickness. The substrate may have no influence on the probe when the probe and substrate are separated by the maximum measured coating thickness or more.

The drive current may be scaled according to a first scaling factor. The detected output may be scaled according to a second scaling factor. The processor may be configured to scale the drive current and detector output according to a first scaling factor and a second scaling factor respectively. The method may include the step of storing the first and second scaling factors as a pair. The processor may be configured to store the first and second scaling factors as a pair. As such, the scaling is controlled by the value of two scaling factors that allows for convenient and repeatable measurements.

The method may comprise the step of changing the scaling applied to the drive current and/or detected output. The processor may be configured to change the scaling applied to the drive current and/or detector output. The scaling may be changed in a step-wise, or discontinuous, manner. The present invention therefore has the advantage of changing the scaling in response to the measured coating thickness to optimise the measurement conditions. Step-wise changes enable the instrument to operate in an open loop mode over ranges of coating thicknesses thus avoiding the problems associated with feedback loops when measuring within those ranges.

The method may include the step of storing two or more pairs of scaling factors. The processor may be configured to store two or more pairs of scaling factors. The method may include the step of selecting a pair of scaling factors. The processor may be configured to select a pair of scaling factors. Scaling factors may be selected according to the instrument output corresponding to the measured coating thickness. Thus pairs of scaling factors are used in the present invention to allow quick and efficient selection of the scaling applied.

The method may include storing a relation between each pair of scaling factors and a range of instrument output values. The method may include the step of selecting a pair of scaling factors with reference to the instrument output values. The processor may be configured to associate each pair of scaling factors to a corresponding range of instrument output values. The processor may be configured to select a pair of scaling factors when the instrument output is within the pair's associated range. Thus, each pair of scaling factors is associated with a range of instrument outputs in which that pair optimises the performance of the probe and the resulting measurement.

The method may include the step of storing one or more output thresholds, and selecting a pair of scaling factors with reference to the output thresholds. The processor may be configured to store one or more output thresholds, and select a pair of scaling factors with reference to the output thresholds. Each output threshold may correspond to a measured coating thickness above which a first pair of scaling factors is selected and below which a second pair of scaling factors is selected. When the instrument output is equal to an output threshold, the instrument output may be the same, or may remain within a predefined tolerance, irrespective of if the associated first or second pair of scaling factors is selected. The predefined tolerance may be ±10%, ±5%, ±1%, or ±0.5%. The method may include selecting the value of each scaling factor to ensure the instrument output remains within the predefined threshold when the selected pair of scaling factors is changed. Where a normalised output is used, the output thresholds may correspond to the normalised output. Thus, the output threshold facilitates simple and quick changes between the selected scaling factors. As the instrument output does not depend on the pair of scaling factors at the output threshold, measurement stability and consistency is improved.

The scaling applied to the detected output of the pick-up coils may counter the scaling applied to the drive current. The step of scaling may comprise an increase in the drive current and a decrease in the detected output of the pick-up coils. The step of scaling may comprise a decrease in the drive current and an increase in the detected output of the pick-up coils. The processor may be configured to scale up the drive current and scale down the detected output of the pick-up coils. The processor may be configured to scale down the drive current and scale up the detected output of the pick-up coils. Thus, changes in the drive current are matched with corresponding changes to the detected output that ensures the scaled detected output is not significantly changed irrespective of the scaling factors used.

The scaling factors may be predefined. The first scaling factor may be inversely proportional to the second scaling factor. The first scaling factor may be within a range defined by the inverse of the second scaling factor, or vice versa. The range may be defined as ±50%, ±40%, ±30%, ±20%, or ±10% of the inverse of the second scaling factor, or first scaling factor respectively. The first scaling factor may be the inverse of the second scaling factor, or vice versa. Thus, the exact value of the scaling factors can be flexibly assigned and set in advance to ensure optimum performance.

The method may include the step of repeating the method if the instrument output indicates a different pair of scaling factors should be selected. The processor may be configured to cause the instrument to re-measure the coating thickness if the instrument output indicates a different pair of scaling factors should be selected. Therefore, the measurement procedure is repeated with the pair of scaling factors that is best suited to the coating thickness to be measured.

The step of determining the measured coating thickness may comprise reading a look-up table relating the instrument output of the transfer function to the measured coating thickness. The processor may be configured to store a look-up table relating the instrument output of the transfer function to the measured coating thickness. The processor may be configured to read the look-up table to determine the measured coating thickness. The look-up table may be independent of the scaling applied to both the drive current and the output of the pick-up coils. Advantageously due to the features of the present invention and selection of scaling factors, a single look-up table is required over the full range of the measurement probe.

The transfer function may depend on the applied constants and/or scaling factors. The output of the transfer function may be more linear than the detected output of the pick-up coils. The rate of change (e.g. voltage per metre change) of the output of the transfer function may be less than the rate of change of the detected output when the measured coating thickness is in the lower 50%, 40%, 30%, 20% or 10% of the range of the measurement probe. The rate of change of the output of the transfer function may be greater than the rate of change of the detected output when the measured coating thickness is in the upper 90%, 80%, 70%, 60% or 50% of the range of the measurement probe. The difference between the maximum and minimum rate of change of the output of the transfer function may be less than the corresponding rate of change of the detected output over the measurement range of the probe. The transfer function may be $$T(x) = \frac{\left(\frac{1}{G1G2} \cdot \frac{V_d(x)}{V_{osc}}\right)}{\left(1 + \frac{\beta}{G1G2} \cdot \frac{V_d(x)}{V_{osc}}\right)}$$

where $T(x)$ is the transfer function, $V_d(x)$ is the detected output of the pick-up coils, x is coating thickness, G1 and G2 are the first and second scaling factors respectively, and $\beta$ and $V_{osc}$ are constants. The constants $\beta$ and $V_{osc}$ may be determined by the measuring range of the probe. The transfer function also has an output voltage $V_{out}(x)$ and a constant valued setpoint (or constant set point voltage) $V_{in}$ associated with it of the form $T(x)=V_{out}(x)/V_{in}$. Constant $\beta$ may be greater than zero and/or less than 1. Constant $V_{in}$ may be greater than zero. The drive current may be dependent either directly or indirectly on any one or more of: G1; $V_{in}$; and $V_{osc}$. $V_{in}$ may be used to control the maximum drive current. The output of the transfer function may be linearly related to the instrument output. The output of the transfer function may be the instrument output. Thus, the inventors have discovered that by applying a transfer function as described above, the detected output is converted into a more linear form conducive of measurements with more stable error. As the rate of change is less at low coating thicknesses, the transfer function also reduces errors and inaccuracies caused by abrasive tip wear.

Where there are two or more pick-up coils they may be coaxially disposed to one side, the opposite side, or on either side of the drive coil. The probe may comprise a probe tip. The probe tip may be metallic e.g. iron, an alloy of iron, or some other suitable combination of materials such as physical vapour deposition (PVD) coated steel. The probe tip may extend through the pick-up coils and the drive coil.

The probe may comprise two, three or more pick-up coils. The probe may comprise two or more drive coils. The probe may comprise a pot core, which encloses the coils. The probe may comprise an open-ended cylinder, which encloses the coils. The pot core and cylinder may be iron, an alloy of iron, or some other suitable magnetic material such as soft ferrite.

The driver may comprise a timer oscillator. The timer oscillator may be configured to generate an alternating signal. The alternating signal may have a frequency between 1 Hz and 1 kHz, or preferably between 10 Hz and 300 Hz, or more preferably 100 Hz. The timer oscillator may be configured to generate a signal with amplitude, $V_{osc}$, that is dependent on $V_{in}$.

The driver may comprise a first modulator. The first modulator may be configured to scale the drive current. The driver may comprise a digital-to-analogue converter (DAC). The DAC may be connected to the one or more drive coils. The DAC may be connected to a drive amplifier. The drive amplifier may be connected to the one or more drive coils. The first modulator may be integrated into the DAC or the timer oscillator.

The detector may comprise an amplifier. The amplifier may comprise one or more inputs. Each input of the amplifier may be connected to a different pick-up coil.

The detector may comprise an analogue-to-digital converter (ADC). The ADC may be connected to the output of the amplifier.

The instrument may comprise a second modulator. The second modulator may be configured to scale the detector output. The second modulator may be incorporated in the detector, such as in the amplifier or ADC, or the processor.

The amplifier may be a differential amplifier.

The instrument may comprise a microprocessor controller. The driver, detector and processor may all be incorporated in, or otherwise implemented by, the microprocessor controller.

The instrument may comprise a user interface. The user interface may be configured to output the measured coating thickness to a user of the instrument. The user interface may be configured to receive control inputs from a user of the instrument. The user interface may be any one or more of a display, touch-screen display, printer, speaker, or the like.

Thus, the instrument can be arranged in a variety of different ways to achieve the advantages of the invention.

DETAILED DESCRIPTION OF THE INVENTION

In order that the invention may be more clearly understood one or more embodiments thereof will now be described, by way of example only, with reference to the accompanying drawings, of which:

Figure 1:
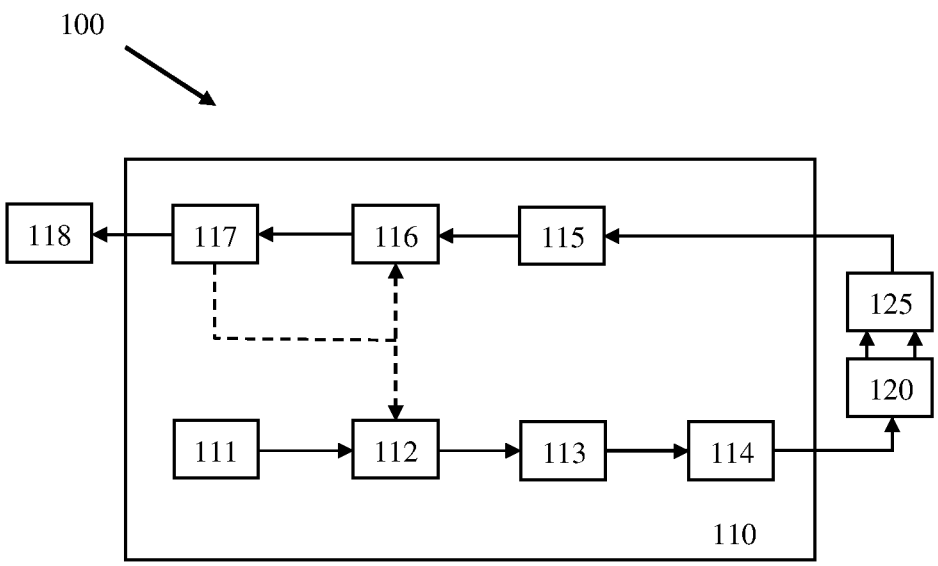
FIG. 1 is a schematic diagram of a coating thickness measurement instrument.
Figure 2:
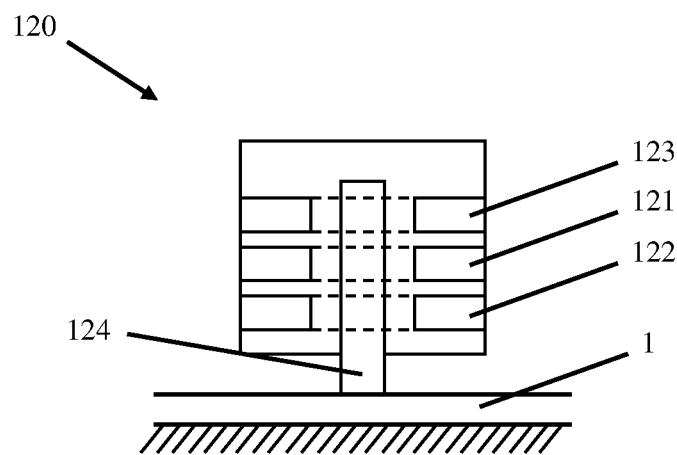
FIG. 2 is a schematic diagram of a probe comprised in the instrument of FIG. 1 in use.

Referring to FIGS. 1 and 2, a coating thickness measurement instrument 100 comprises a microprocessor controller 110, a coating thickness probe 120, an amplifier 125, and a user interface 118 connected electronically. The controller 110, amplifier 125 and user interface 118 are additionally connected to an electric power supply (not shown). The amplifier 125 is typical to the art and comprises two inputs and an output (not shown), wherein the output depends on the difference of the signals applied at each input.

The user interface 118 is connected to the microprocessor controller 110 and communicates the measured coating thickness to a user (not shown) of the instrument 100. In this embodiment, the user interface 118 is a display, however in other embodiments it could be any suitable user interface such as a speaker, touch-screen display, printer, or the like. In some embodiments, the user interface 118 may simply indicate when a measured coating thickness is within a given range. This may be indicated by a light or sounder.

The microprocessor controller 110 comprises: a timer oscillator 111; a first modulator 112; and, a digital-to-analogue converter (DAC) 113, connected in series. In this embodiment, the DAC is followed by a drive amplifier 114. The microprocessor 110 additionally comprises: an analogue-to-digital converter (ADC) 115; a second modulator 116; and, a coating thickness processor 117, these three components are also connected in series. The coating thickness processor 117 is also connected to the two modulators 112, 116 to provide control signals to them (broken lines in FIG. 1).

The coating thickness probe 120 comprises a drive coil 121 and two pick-up coils 122, 123 coaxially disposed either side of the drive coil 121. A metallic, e.g. hardened steel, probe tip 124 comprises a pin that extends through the axis of the coils 122, 121, 123 and, in use, one end of the tip 124 contacts a coating 1 to be measured on a metallic, e.g. low carbon steel, substrate 2. In use an alternating current in the drive coil 121 induces a voltage in the pick-up coils 122, 123 that depends on the amplitude of the current in the drive coil 121 and the proximity of the end of the probe tip 124 to the substrate 2. As one coil 122 is closer to the substrate 2 than the other 123, the amplitude of the induced voltage in each pick-up coil is different. This is the main physical principle on which differential magnetic induction coating thickness instruments are based.

The DAC 113 connects to the drive coil 121 of the probe 120 via the drive amplifier 114. The two inputs of the amplifier 125 are connected to the two pick up coils 122, 123. This allows the amplifier 125 to differentially compare the voltage induced in the pick-up coils. The output of the amplifier 125 is connected to the ADC 115.

Referring to FIGS. 1-2, in use the timer oscillator 111 is configured to generate an alternating signal with amplitude, $V_{osc}$. The frequency of the current in this embodiment is 100 Hz, but other suitable frequencies may be chosen.

The first modulator 112, and second modulator 116 are configured to scale a signal according to a first scaling factor, G1, and a second scaling factor, G2, respectively.

The DAC 113 and ADC 115 are configured to convert a digital signal into an analogue electric signal and vice versa respectively.

The coating thickness processor 117 is configured to: apply a transfer function T(x) to signals indicative of the difference in the signals induced in each pick up coil 122, 123; store a look-up table relating a normalised output $V_n(x)$ of transfer function T(x) to the measured coating thickness; and, determine the measured coating thickness in response to the calculated normalised output $V_n(x)$ of the transfer function. The transfer function T(x) is described in more detail below.

The coating thickness processor 117 is also configured to: store a list containing pairs of scaling factors; select a pair of scaling factors in response to the normalised output $V_n(x)$; and, control the scaling factors G1, G2 applied by the first 112 and second 116 modulators according to the selected pair of scaling factors.

G1 is chosen to optimise the amplitude of the voltage in the drive coil 121 and G2 reverses any effect G1 has had on the signals output by the pick-up coils 122, 123. As such, G1 and G2 are substantially the inverse of each other.

In this embodiment, the coating thickness processor 117 selects one of two pairs of scaling factors to be applied according to the normalised output $V_n(x)$ being above or below a normalised output threshold TV1. The normalised output $V_n(x)$ is determined from an instrument output, $V_{out}(x)$, during calibration and is a linear scaling of the range of $V_{out}(x)$ between 0 and 1. The instrument output $V_{out}(x)$ is calculated directly using the transfer function as described below.

A normalised output $V_n(x)$ of 0 corresponds to a reading taken on an uncoated substrate 2, and a normalised output of 1 corresponds to the probe 120 held away from the influence of substrate 2. In this embodiment, the normalised output threshold TV1 is 0.26+/−0.01, which corresponds to a nominal coating thickness of 500 microns. In another example, TV1 is 0.2619 and the nominal coating thickness is a measured coating thickness of 511 microns. In other embodiments, additional pairs of scaling factors could be used, each relating to a range of normalised outputs.

The exact values of G1 and G2 are configured during manufacture to ensure the normalised output $V_n(x)$ is stable at the normalised output threshold TV1. In this embodiment the pairs of values (G1, G2) are (1.0, 1.0) when the normalised output $V_n(x)$ is below the normalised output threshold TV1 of 0.26+/−0.01, and (3.0, 0.33+/−0.01) above. In a different example, the pairs of values (G1, G2) are (1.0, 1.0) when the normalised output $V_n(x)$ is below the normalised output threshold TV1 of 0.2619, and (3.0, 0.4424) above. As such, a larger signal is driven in the drive coil 121 when measuring at greater coating thicknesses. This optimises instrument performance as the difference in the induced voltage in the pick-up coils 122, 123 decreases exponentially as the coating thickness increases. A larger drive current increases the absolute differential output of the probe leading to an improved signal to noise ratio of the output signal. This prevents distortion and clipping of the output of amplifier 125 associated with measuring close to the substrate 2 using a fixed drive current while maintaining a suitable signal amplitude when measuring far from the substrate 2. Using two or more pairs of scaling factors allows the output of the amplifier 125 to be increased while avoiding distortion.

Figure 3:
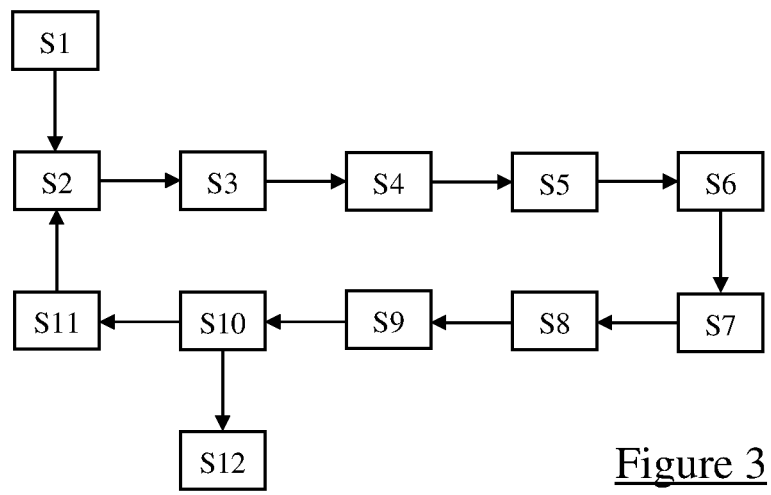
FIG. 3 is a flow diagram for the process the instrument of FIG. 1 follows to take a measurement.

Referring to FIG. 3, the process for making a coating thickness measurement begins at step S1, the coating thickness processor 117 selects a first pair of scaling values and passes each value in the pair to the first 112 and second 116 modulators respectively. In this embodiment, the processor initially selects the pair of scaling values that are applied when the normalised output $V_n(x)$ is above the normalised output threshold TV1. In other embodiments, any suitable pair could be selected as an initial pair.

At step S2, the timer oscillator 111 generates an alternating signal with amplitude $V_{osc}$, and passes the signal to the first modulator 112.

At step S3, the first modulator 112 applies the first scaling factor G1 received from the processor 117 to the signal. At step S4, the DAC 113 and drive amplifier 114 convert the scaled signal into an analogue electric signal with a voltage proportional to both G1 and $V_{osc}$.

At step S5, the analogue signal drives a current in the drive coil 121. This induces a voltage in the pick-up coils 122, 123 that depends on the amplitude of the current in the drive coil 121 and the proximity of the end of the probe tip 124 to the substrate 2. As one coil 122 is closer to the substrate 2 than the other 123, the amplitude of the induced voltage in each pick-up coil is different.

At step S6, the induced voltage in each pick-up coil 122, 123 is read by the amplifier 125, and converted into an analogue output that depends on the difference in the voltage induced in each pick-up coil 122, 123, as well as both G1 and $V_{osc}$.

At step S7, the analogue output is converted into a digital output signal by the ADC 115. At step S8, the second modulator applies the second scaling factor G2 received from the processor 117 to the digital output signal, reversing the effect G1 has had on the output signal.

At step S9, the coating thickness processor 117 reads the scaled output signal, $V_d(x)$, output from the second modulator 116 and applies the transfer function to determine an instrument output, $V_{out}(x)$, as described below. The processor then normalises the output of the transfer function and uses this normalised output value, $V_n(x)$, to determine a measured coating thickness from the stored lookup table.

At step S10, the processor 117 compares the normalised output to the normalised output threshold TV1 to determine the appropriate pair of scaling values for the measurement.

If the normalised output indicates the appropriate pair of scaling values is not currently selected, at step S11 the processor 117 selects the appropriate pair of scaling values, and passes them to the first 112 and second 116 modulators. The process then returns to step S2.

If the normalised output indicates the appropriate pair of scaling values were selected, at step S12 the user interface 118 displays the measured coating thickness determined in step S9 and the process ends.

To avoid looping from steps S11 to S2 repeatedly, certain embodiments of the invention may implement additional controls. For example, a new pair of scaling values may only be selected if they have not been selected before, or a tolerance may be applied to the normalised output threshold TV1, where a normalised output within the tolerance does not initiate a change in scaling factors. The tolerance could be the normalised output threshold TV1+/−10%.

The error in the measurement made by the instrument can be divided into two broad categories, those of systematic and random measurement error. Systematic errors are largely traceable to the probe system 120 design and include the influence of substrate 2 permeability, homogeneity, thickness and geometry; the electrical properties and thickness of the substrate coating 1 also have an influence on this type of error. Other sources of systematic error are associated with the electronic signal processing of the detected probe voltage, $V_d(x)$, and include the effects of temperature drift, DC offsets and harmonic distortion. Systematic errors can be minimised through suitable design of the probe system 120 and through calibration. Random errors affect measurement precision and are a consequence of electronic noise, substrate and coating surface properties, and the placement of the probe during the process of taking a thickness reading. The magnitude of random errors and their impact on measurement precision can be a consequence of the design choices made to optimise the performance of the probe system 120. The random measurement errors caused by electronic noise are strongly dependent on the rate of change of $V_{out}(x)$ as a function of coating thickness. It is desirable to minimise this form of measurement error over the full range of measurable coating thicknesses to ensure simple interpretation of the results. However, the output $V_{out}(x)$ is highly non-linear and can be approximated as decaying exponentially with increasing coating thickness. This leads to low measurement error at the lowest measurable thicknesses but much higher error throughout the rest of the range. As such, the transfer function has been designed to convert detector output $V_d(x)$ into an instrument output $V_{out}(x)$ that is approximately linear as a function of coating thickness. This has a more constant rate of change, and as such, a more consistent effect on measurement precision over the full measuring range. The transfer function is:

$$T(x) = \frac{\left(\frac{1}{G1G2} \cdot \frac{V_d(x)}{V_{osc}}\right)}{\left(1 + \frac{\beta}{G1G2} \cdot \frac{V_d(x)}{V_{osc}}\right)}$$

where $V_d(X)$ is the output voltage of the detector amplifier 125 and $V_{osc}$ the output of the timer oscillator 111. $\beta$ is a positive non-zero constant determined in factory setup of the instrument. In this embodiment, $\beta=0.0025$. In other embodiments, β=0.005 or any other suitable value for the measurement probe to operate effectively according to the factory setup.

The instrument output $V_{out}(x)$ is related to the transfer function by:

$$T(x) = \frac{V_{out}(x)}{V_{in}}$$

where $V_{in}$ is a constant valued set point (or constant voltage set point) used to control the drive current and preferably the maximum drive current. In this embodiment $V_{in}>0$. The normalised output $V_n(x)$ is then calculated from a linear scaling of $V_{out}(x)$ as described above. In a different embodiment, $V_{in}=12$ or any other suitable value for the measurement probe to operate effectively according to the factory setup.

By setting the scaling values and generating a linear output as described above, the electronic noise related measurement errors can be optimised over the full measurement range. In addition, only a single look-up table is required irrespective of the coating thickness, or applied scaling.

Figure 4A:
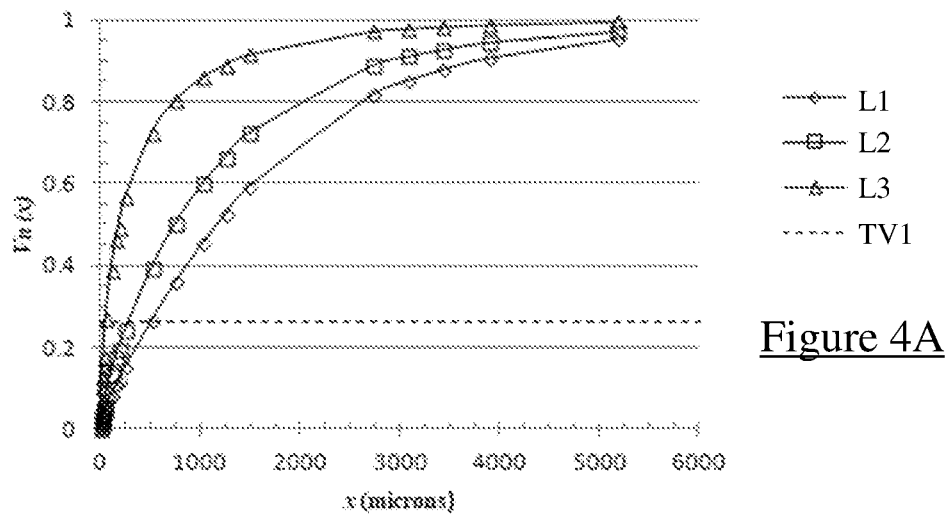
FIG. 4A is a graph comparing the normalised output $V_n(x)$ against coating thickness x for three coating thickness measurement instruments, including the instrument of FIG. 1.
Figure 4B:
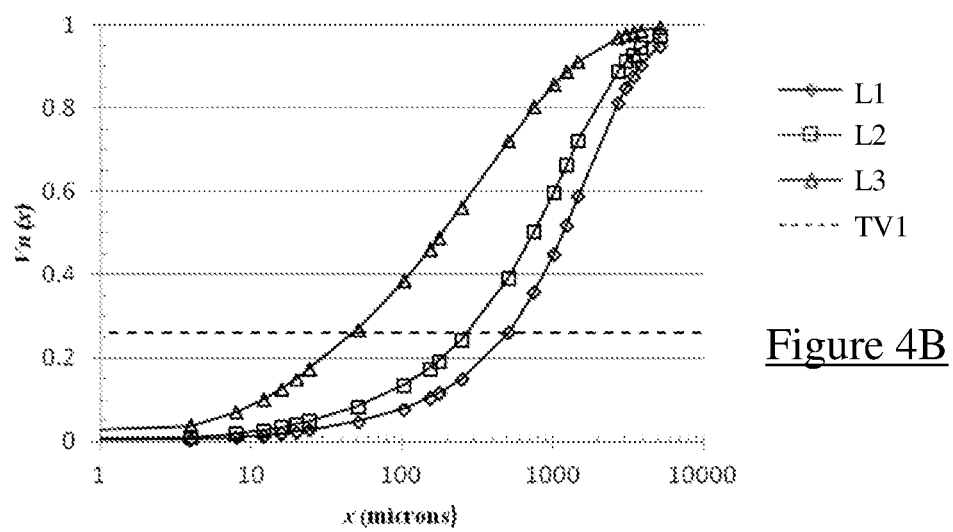
FIG. 4B is the graph of FIG. 4A with a logarithmic scale applied to the coating thickness.

FIGS. 4A and 4B shows the normalised output $V_n(x)$ as a function of coating thickness x for: the embodiment of the present invention described above (L1); the instrument disclosed in GB2367135A in its second operating mode (L2); and a coating thickness instrument according to the embodiment described above operating without a transfer function and restricted to the first pair of scaling values (G1=1.0, G2=1.0) (L3). The line L1 has improved sensitivity (higher rate of change) compared to L3 in the upper 80% of the instrument's range (1,000-5,000 microns) and a more consistent rate of change across the full range of thickness values, leading to improved measurement precision and performance.

The effect of the transfer function can be seen when comparing lines L1 and L3. L3 rapidly increases from 0 to above 0.8 in the short range coating thicknesses, 0-1,000 microns, leading to a low rate of change in the range 1,000-5,000 microns. In contrast, L1 reaches 0.4 at a thickness of 1,000 microns leading to an increased rate of change in the range 1,000-5,000 microns compared to L3, and a more consistent rate of change over the full range of 0-5,000 microns. As such, the measurement precision is much better when using L1 compared to L3. The effect of a reduction in measurement precision in the 0-100 microns measurement region of L1, which is below the normalised output threshold (TV1), can be mitigated with the selection of appropriate values for G1 and G2.

Another advantage of the instrument 100 is that it is less susceptible to abrasive tip wear, which includes probe tips that have a non-magnetic anti-abrasive coating applied. Examples of such tips include PVD coated hardened steel and high permeability magnetic alloys with a hard-wearing slug of tungsten carbide embedded. Abrasive tip wear affects instrument accuracy, the effect being exacerbated by a high rate of change of $V_d(x)$ in the region of 0-100 microns. By applying the transfer function, the rate of change in this region is reduced which improves the tolerance of the instrument 100 to abrasive tip wear. As above, any reduction in sensitivity caused by this can be mitigated with the selection of appropriate values for G1 and G2.

The skilled person will appreciate that other embodiments of the invention may achieve the same effect through a variety of different but equivalent means. For example, the first modulator may be integrated into the timer oscillator to control the amplitude of its output directly. In addition, the effect of the second oscillator may be incorporated into the transfer function itself, or into the sensitivity settings of the differential amplifier.

The one or more embodiments are described above by way of example only. Many variations are possible without departing from the scope of protection afforded by the appended claims.

The invention claimed is:

1. A coating thickness measuring instrument comprising:
   a magnetic induction probe comprising at least one drive coil and at least one pick-up coil;
   a driver for driving an alternating drive current in the or each drive coil and comprising a first modulator configured to scale the drive current in the or each drive coil according to a first scaling factor;
   a detector for detecting an output of the or each pick-up coil;
   a second modulator configured to scale an output of the detector according to a second scaling factor; and
   a processor configured to: apply a transfer function to an output of the second modulator to produce an instrument output corresponding to a measured coating thickness; and change both the first and second scaling factors simultaneously based on the instrument output.

2. An instrument as claimed in claim 1 wherein the processor is further configured to store the first and second scaling factors as a pair.

3. An instrument as claimed in claim 2 wherein the processor is further configured to store two or more pairs of scaling factors, and select a pair of scaling factors according to the instrument output.

4. An instrument as claimed in claim 3 wherein the processor is configured to associate each pair of scaling factors to a corresponding range of the instrument output, and select a pair of scaling factors when the instrument output is within the pair's associated range.

5. An instrument as claimed in claim 1 wherein the transfer function depends on the applied scaling factors.

6. A method of measuring coating thickness using a coating thickness probe comprising at least one drive coil and at least one pick-up coil, the method comprising the steps of:
   driving an alternating drive current in the or each drive coil;
   scaling the alternating drive current in the or each drive coil according to a first scaling factor using a first modulator;
   detecting a signal output by the or each pick-up coil using a detector;
   scaling an output of the detector according to a second scaling factor using a second modulator;
   applying a transfer function to an output of the second modulator to determine an instrument output corresponding to a measured coating thickness; and
   changing both the first and second scaling factors simultaneously based on the instrument output.

7. A method as claimed in claim 6 wherein method includes the step of changing the first and second scaling factors in a step-wise manner.

8. A method as claimed in claim 6 wherein the scaling applied to the detected output of the or each pick-up coil counters the scaling applied to the drive current.

9. A method as claimed in claim 8 wherein the step of scaling comprises an increase in the drive current and a decrease in the detected output of the or each pick-up coil, or a decrease in the drive current and an increase in the detected output of the or each pick-up coil.

10. A method as claimed in claim 6 wherein the step of determining the measured coating thickness comprises reading a look-up table relating the instrument output to the measured coating thickness.

11. A method as claimed in claim 6 including the step of storing two or more pairs of scaling factors, wherein each pair of scaling factors comprises a first and second scaling factor.

12. A method as claimed in claim 11 including the step of storing a relation between each pair of scaling factors and a range of the instrument output.

13. A method as claimed in claim 11 including the step of selecting a pair of scaling factors with reference to the instrument output.

14. A method as claimed in claim 13 including the step of repeating the method if the instrument output indicates a different pair of scaling factors should be selected.

15. A method as claimed in claim 6 wherein the step of applying the transfer function includes determining a normalised output and using the normalised output in place of the instrument output.

16. A method as claimed in claim 6 wherein the transfer function is $$T(x) = \frac{\left(\frac{1}{G1G2} \cdot \frac{V_d(x)}{V_{osc}}\right)}{\left(1 + \frac{\beta}{G1G2} \cdot \frac{V_d(x)}{V_{osc}}\right)}$$

where $T(x)$ is the transfer function with output $V_{out}(x) = T(x)V_{in}$, $V_d(x)$ is the detected output of the or each pick-up coil, Gi and G2 are the first and second scaling factors, and $V_{in}$, f3 and $V_{ose}$ are constants, $V_{in}$ is a voltage set point used to control the alternating drive current, $V_{ose}$ is an amplitude of the alternating drive current and $V_{out}(x)$ is the instrument output used to determine the measured coating thickness.

17. A coating thickness measuring instrument comprising:
a magnetic induction probe comprising at least one drive coil and at least one pick-up coil;
a driver for driving an alternating drive current in the or each drive coil;
a detector for detecting an output of the or each pick-up coil; and
a processor configured to: apply a transfer function to a detector output to produce an instrument output corresponding to a measured coating thickness;
and scale both the alternating drive current and the detector output simultaneously in response to the instrument output,
wherein the transfer function is $$T(x) = \frac{\left(\frac{1}{G1G2} \cdot \frac{V_d(x)}{V_{osc}}\right)}{\left(1 + \frac{\beta}{G1G2} \cdot \frac{V_d(x)}{V_{osc}}\right)}$$

where $T(x)$ is the transfer function with output $V_{out}(x) = T(x)V_{in}$, $V_d(x)$ is the detected output of the or each pick-up coil, $G_1$ and $G_2$ are first and second scaling factors which define the scaling applied to the alternating drive current and detector output respectively, and $V_{in}$, f3 and $V_{ose}$ are constants, $V_{in}$ is a voltage set point used to control the alternating drive current, $V_{ose}$ is an amplitude of the alternating drive current and $V_{out}(x)$ is the instrument output used to determine the measured coating thickness.

* * * * *